United States Patent [19]

Ronci

[11] Patent Number: 4,468,803
[45] Date of Patent: Aug. 28, 1984

[54] X-RAY FILM CASSETTE FRAME SUSPENSION APPARATUS

[76] Inventor: Mary R. Ronci, 143 Hoffman Ave., Apt. 405, Cranston, R.I. 02920

[21] Appl. No.: 427,804

[22] Filed: Sep. 29, 1982

[51] Int. Cl.³ .................................. G03B 41/16
[52] U.S. Cl. .................................. 378/181; 378/167
[58] Field of Search ............... 378/177, 178, 179, 180, 378/181, 167

[56] References Cited

U.S. PATENT DOCUMENTS 2,651,725  9/1953  McFarland .................. 378/177
3,795,815  3/1974  Weinstock .................. 378/181

*Primary Examiner*—Craig E. Church
*Attorney, Agent, or Firm*—William Frederick Werner

[57] ABSTRACT

Suspension apparatus is disclosed for holding an X-ray film cassette frame. The apparatus includes clamping means attachable to a suitable support and or a series of independently adjustable arms providing a support for the cassette frame. The arms are adapted for adjustment variously in horizontal and vertical planes with reference to the mounting position of the clamping means and cooperate to extend and retract relative to said clamping means. Thus the cassette frame can be moved through included angles of 360° in both the horizontal and vertical planes and can be extended and retracted between the clamping means and a subject to be photographed. In practice with the present invention it is possible to X-ray a wide variety of different areas of a patient while permitting the subject to remain immobile by adjusting the X-ray film in the cassette to accommodate the position of the immobile patient.

6 Claims, 7 Drawing Figures

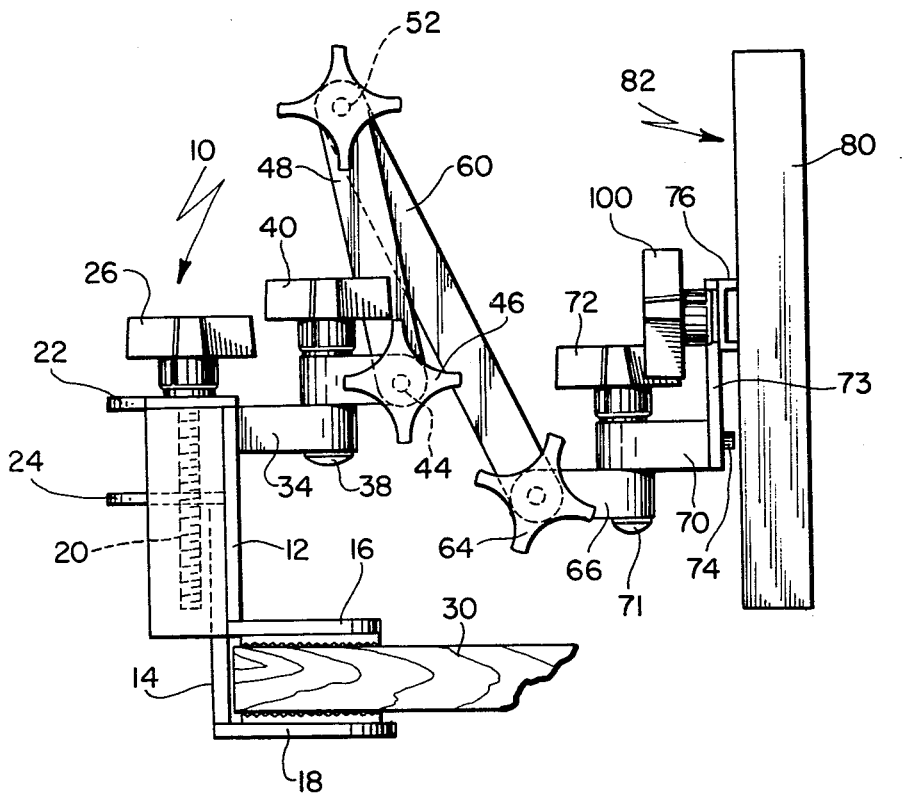
FIG. 5
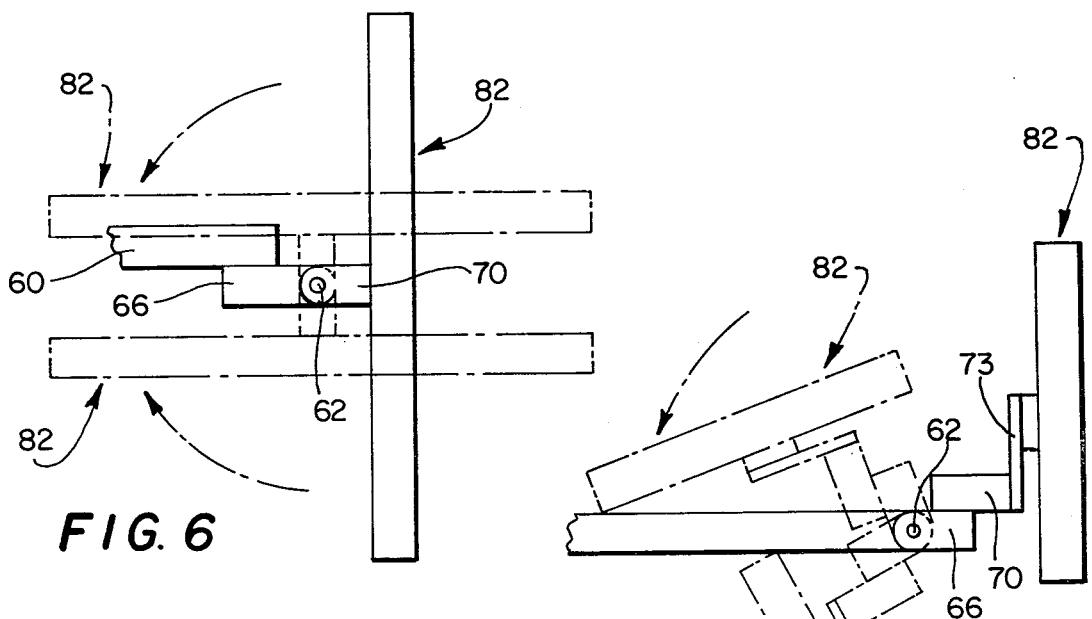
FIG. 6
FIG. 7

X-RAY FILM CASSETTE FRAME SUSPENSION APPARATUS

BACKGROUND OF THE INVENTION

1. Field of the Invention

The present invention relates to suspension systems and relates, more particularly, to suspension systems of the type for supporting X-ray film in location at virtually any desired angle during an X-ray procedure.

2. Description of the Prior Art

In the practice of X-raying patients it has heretofore been generally necessary to move the patient through a variety of positions to photograph differing anatomical parts of said patient. This procedure has some rather obvious shortcomings in that it often is desirable to keep the patient immobilized. Also, movement of the patient to a prescribed position relative to the X-ray unit and then retention of the patient in that position while photographing is accomplished is often difficult to accomplish and can, in fact, be harmful to the patient. Further, movement of the patient to different positions is often a difficult and laborious task.

The present invention overcomes the deficiencies of the prior art and provides a suspension system for a film cassette frame whereby the film which is held in the frame can be located at any desired angle to thereby arrange the film to photograph the desired anatomical section of the patient while allowing the patient to remain immobile as X-raying of various areas of the patient is conducted.

SUMMARY OF THE INVENTION

According to the present invention in the disclosed embodiment a suspension apparatus for an X-ray film cassette frame comprises a clamp arranged to be secured to a suitable support such as a table. A series of independently adjustable suspension arms are provided to form an adjustable linkage supporting the cassette frame. The suspension arms are movable variously in horizontal or vertical planes relative to the clamp and also cooperate to permit extension and retraction of the cassette frame relative to the clamp. By means of the unique arrangement of the arms which support the frame, the frame and thus the film held therein can be pivoted through the horizontal and vertical planes for essential 360°. The various suspension arms of the disclosed apparatus are secured together by a series of quick-acting locking bolts to selective lock the several arms in the desired attitudes. Simple release of one or more of the quick-acting clamping bolts permits adjustment of the different arms between positions whereby horizontal, vertical and longitudinal adjustment of the cassette frame and the X-ray film therein is achieved. Relocation of the film from position to position is accomplished quickly and efficiently, without shifting of the position of the subject being photographed.

OBJECTS OF THE INVENTION

A first object of the present invention is to provide a new and improved suspension apparatus for holding an X-ray film cassette frame.

Another object of the present invention is to provide a new and improved suspension apparatus for mounting X-ray film and which permits rapid and efficient orientation and reorientation of the film in a variety of different position relative to the subject being photographed without moving of the subject.

An additional object of the present invention is to provide suspension apparatus for supporting an X-ray cassette frame which is universally adjustable, simple in operation, yet which is compact in construction and durable and reliable in use.

BRIEF DESCRIPTION OF THE DRAWINGS

The present invention is illustrated in the accompanying drawings in which like numerals refer to like parts and wherein:

FIG. 5 is a view similar to FIG. 1 illustrating the apparatus arranged in an alternate retracted position;

FIG. 6 is a top plan view of a portion of FIG. 1 illustrating the cassette frame and its path of movement in a horizontal plane; and FIG. 7 is a view similar to FIG. 6 illustrating the cassette frame and its path of movement in a vertical plane.

DESCRIPTION OF THE PREFERRED EMBODIMENT

Figure 1:
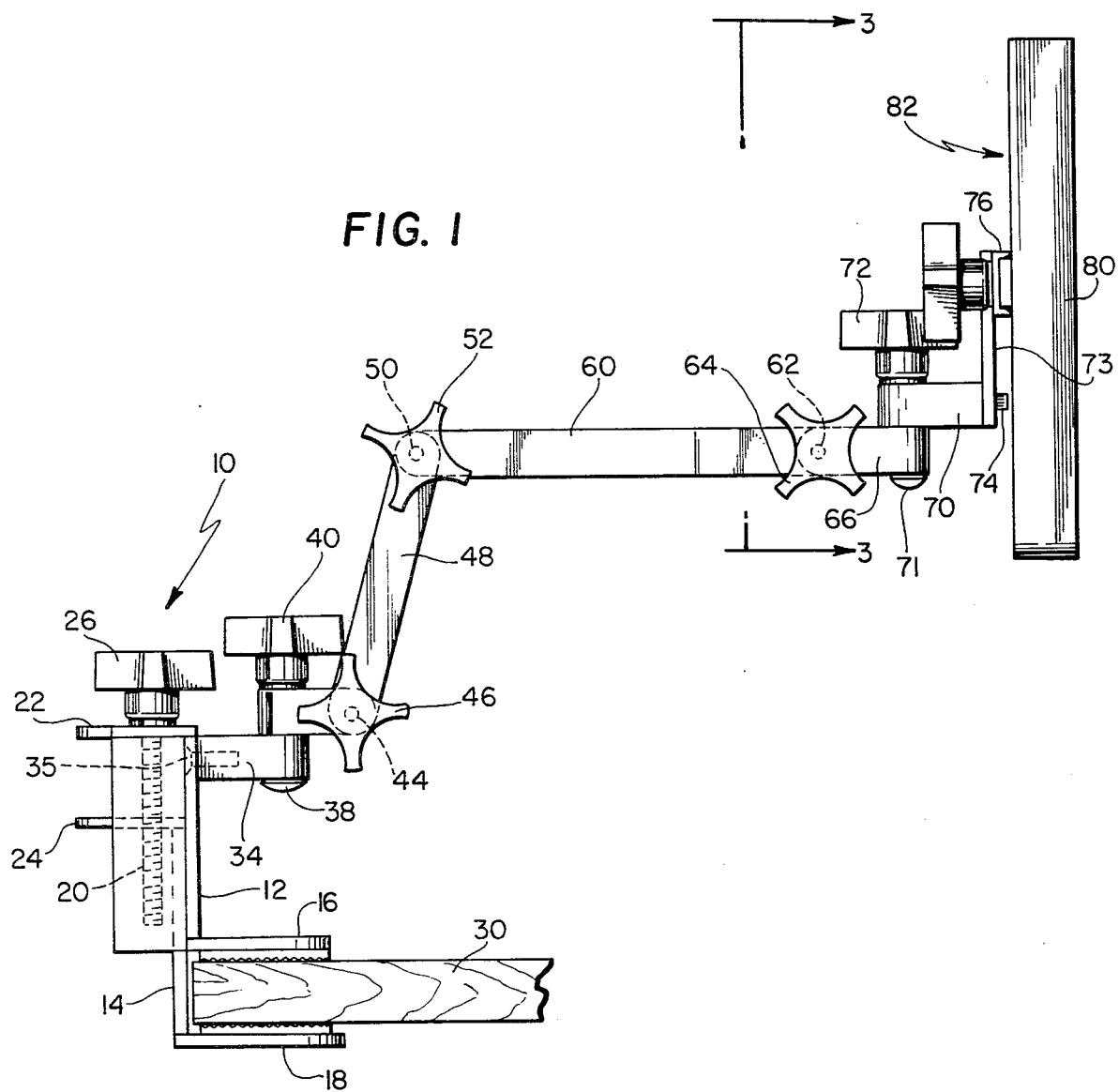
FIG. 1 is a side elevational view of the X-ray film cassette frame suspension apparatus of the present invention illustrating the clamping device thereof secured in operative position on a holding element.

The suspension apparatus of the present invention has already been stated as providing a means for articulation of an X-ray film cassette through horizontal and vertical angles to position the film in location proximate to an immobile subject. In accordance with these provisions and with initial reference to FIG. 1 of the drawing the suspension apparatus includes a clamping device 10 which may be manufactured of metal and which includes a fixed member 12 and a slidable member 14. Each of the members 12 and 14 terminate in a clamping jaw 16 and 18, respectively. An adjusting screw 20 passes through a suitable clearance in the upper extension 22 of fixed member 12 and threadedly engages with upper extension 24 of member 14. Thus selective rotation of adjusting screw 20, the upper portion 26 of which is flanged to bear on the upper surface of extension 22 of member 12, causes slidable member 14 to slide up and down relative to fixed member 12. In consequence the gap between jaws 16 and 18 is opened and closed for clamping and releasing action. As seen in FIG. 1, the clamping jaws 16, 18 are employed to securely engage the clamping device 10 onto a surface such as a table 30.

With continuing reference to FIG. 1 to forward face or wall 32 of fixed member 12 has a projection 34 affixed thereto as by means of bolts 35. An arm 36 is pivotably mounted onto the upper surface of projection 34 by a clamping screw 38. Said clamping screw has an enlarged head 40 which serves as a convenient knob for rotating the screw. The threaded shank of the screw 38 passes through an operative in arm 36 and threadedly engages with projection 34. Thus, as the screw is loosened, arm 36 can be pivoted through an included angle of about 220° around screw 38 and can be locked in any desired position within the sweep of the angle by tightening screw 38.

Figure 4:
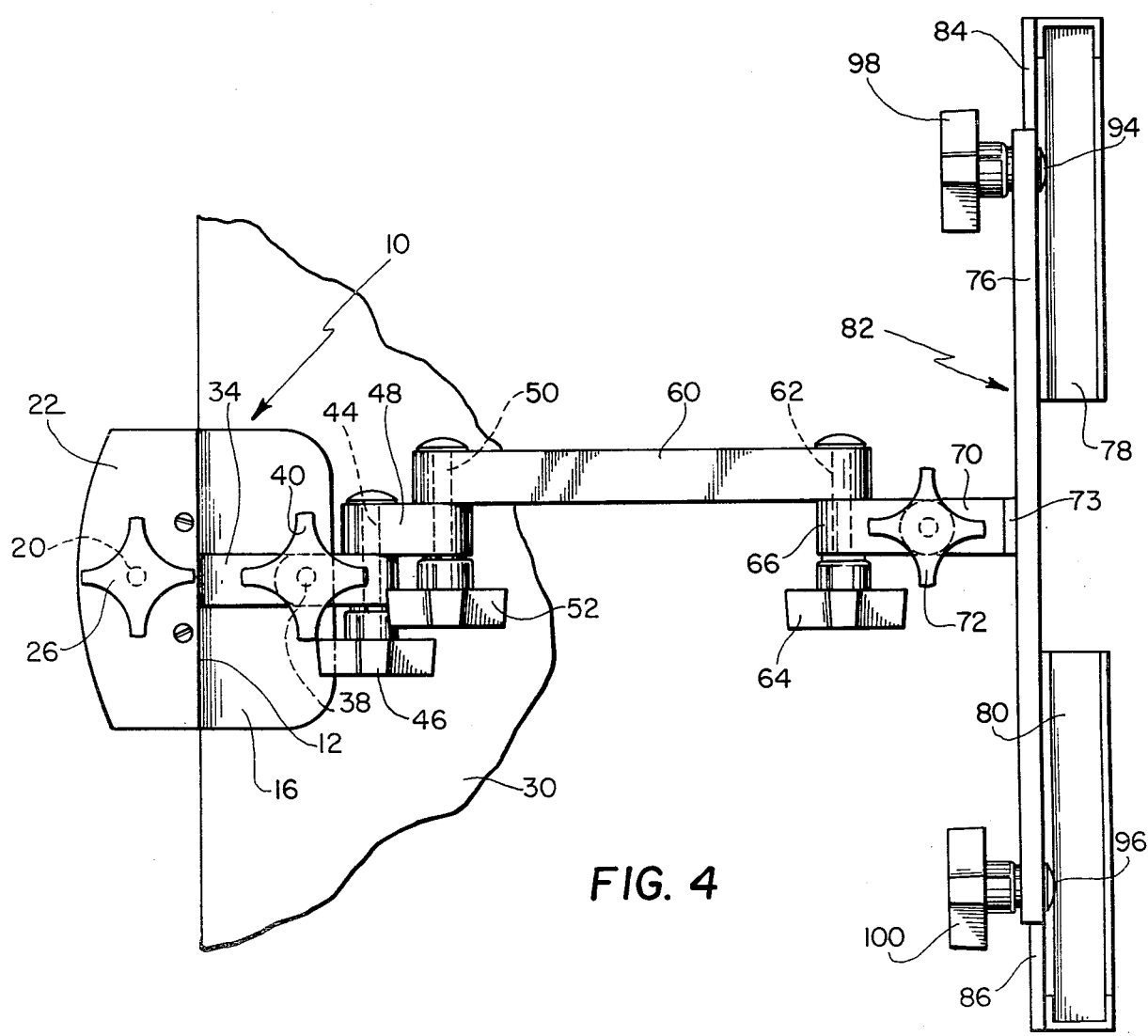
FIG. 4 is a top plan view of the apparatus of FIG. 1.

The forward end of arm 36 is bored through to provide an operative for a further clamping screw 44 which, like screw 38, has an enlarged knob 46 at its head end. The threaded shank of screw 44 is engaged into a threaded hole at one end of a further arm 48. As seen in FIGS. 1 and 4, arm 48 is movable in a plane at right angles to the path of movement of arm 36. That is to say, if arm 36 pivots in a horizontal plane, then arm 48 is swingable in a vertical plane. The forward end of arm 48 is bored through for passage of a further clamping screw 50 provided with a knob 52 for rotation of the screw. The threaded shank of screw 50 passes through the aforementioned bore in arm 48 and threadedly engages with one end of an arm 60. Upon release of clamping screw 50 arm 60 is articulatable in the same plane as arm 48.

The forward end of arm 60 is bored through to provide clearance for the shank of a further clamping screw 62 provided with operating knob 64. The threaded shank of screw 62 threadedly engaged with a tapped hole in an arm 66 which, when released from the clamping action of screw 62, is pivotable in the same plane as arms 48 and 60. As seen in FIGS. 1 and 7 arms 60 and 66 are movable in an arc of generally 360° about their pivots. The outer or forward end of arm 66 has a threaded hole therein. Mounted on the upper surface of the forward end of arm 66 is a link 70. A clamping screw 71, having operating knob 72, passes through a clearance bore through link 70 and engages in the threaded hole at the forward end of arm 66. By means of this mounting arrangement link 70 is swingable in a plane perpendicular to the plane of movement of arms 48 and 60. This plane of movement is through an arc of generally 360° as seen in FIG. 6 to thereby permit the cassette frame next to be described to swing in the same arc.

Figure 2:
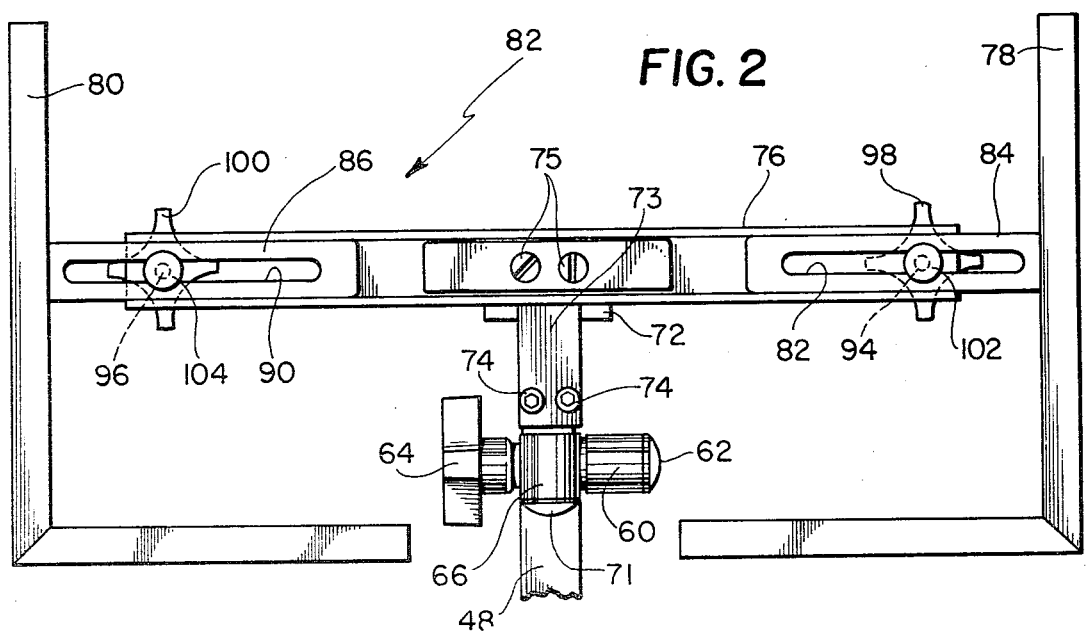
FIG. 2 is a front elevational view of the suspension apparatus and illustrating details of the cassette frame.
Figure 3:
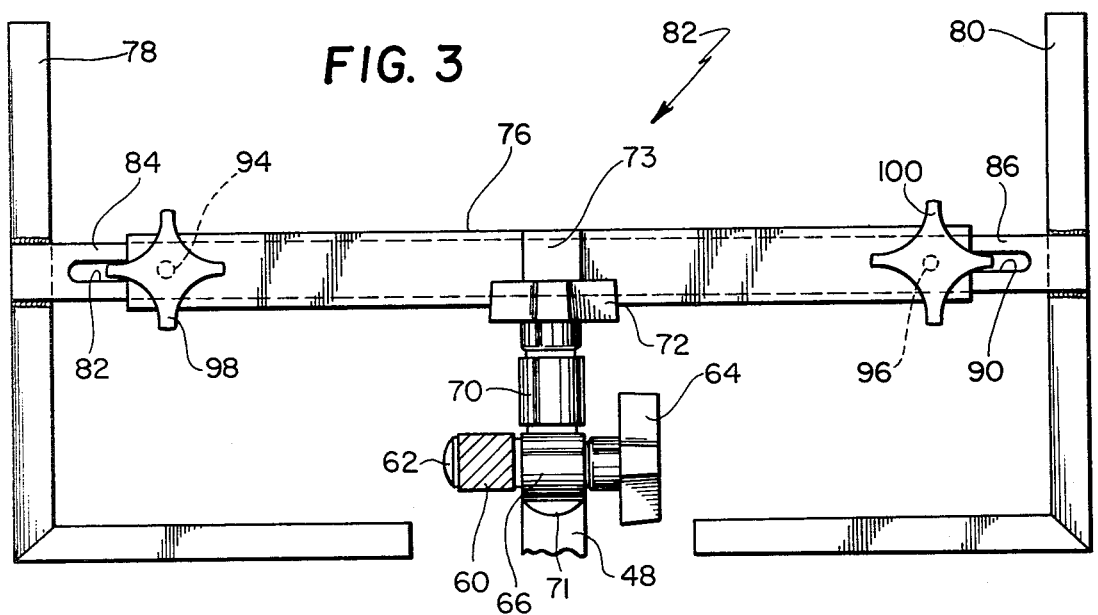
FIG. 3 is a rear view of the cassette frame of FIGS. 1 and 2.

With particular attention now to FIGS. 1, 2 and 3 the forward end of link 70 is rigidly secured to a depending connector tab 73 by means of a set screw 74. In turn, connector tab 73 is secured by means of screws 75 to a cross member 76 which has a U-shaped cross section. Within the recess provided by the cross member 76 there is slidably positioned a pair of U-shaped film cassette holding members 78 and 80 which constitute a portion of an X-ray film cassette frame 82. Each of the members 78, 80 has a slidable supporting bar 84, 86 respectively engaged in the channel of U-shaped cross member 76. Each of the supporting bars 84, 86 is provided with an elongated slot 88, 90 (FIGS. 2 and 3). Cross member 76 has a pair of holes therethrough, one adjacent each of its ends. A pair of clamping screws 94, 96 pass through the respective holes and through an associated one of the slots 88, 90 of bars 84, 86. One end of each of the clamping screws 94, 96 is provided with an operating knob 98, 100 and the opposite end of each screw 94, 96 has a flanged head 102, 104 which bears on the forward surface of its associated bar 84, 86. Thus, it will be evident the X-ray film cassette fram 82 is pivotable with its link 70 about the axis of screw 71.

In accordance with the present invention the operator of the X-ray unit may secure the apparatus of the present invention in position by operating clamping device 10 to engage the apparatus on a secure surface such as table 30. Thereafter, an X-ray film cassette is mounted in frame 82. At this point in time one or more of the clamping screws 38, 44, 50, 62 and 71 are loosened to permit adjustment of the X-ray film to the desired position relative to the subject to be photographed. Thereupon the clamping screw or screws are tightened to secure the various arms, and thus the film, in position. Now, if further X-ray photographs are to be taken of the subject there is normally no need to move the subject. Rather, the position of the film is adjusted to accommodate the position of the subject. This is accomplished by again loosening one or more of the clamping screws 38, 44, 50, 62 and 71 to arrange the film cassette in the next desired attitude. Such arrangement can readily be accomplished by vertical, horizontal or even longitudinal movement of the frame 82 and the film retained therein. Additionally, the scope of motion is such that frame 82 can be moved both horizontally and vertically through arcs approaching 360° (FIGS. 6 and 7) of movement and longitudinal extension and retraction of the frame 82 through the full limits of the suspension arms can be achieved as shown in FIGS. 1 and 5, for example.

The advantages of the present invention, as well as certain modifications of the disclosed embodiment thereof, will be readily apparent to those skilled in the art. Since certain changes may be made in the foregoing apparatus without departing from the scope of the invention herein involved, it is intended that all matter contained in the above description and provided in the accompanying drawing shall be interpreted as illustrative only and not in a limiting sense.

What is claimed is:

1. Suspension apparatus for an X-ray film cassette frame comprising a clamping member for rigid attachment to a supporting element, a projection rigidly attached to said clamping member, a first arm connected to said projection for pivoting movement in a first plane through a path of approximately 220°, a second arm connected with said first arm and pivotable in a second plane through a path of more than 180°, a third arm connected with said second arm and pivotable in said second plane through a path of generally 360°, a fourth arm connected with said third arm and pivotable in said second plane through a path of generally 360°, a link connected with said fourth arm and pivotable in said first plane through a path of approximately 360°, coupling means connecting an X-ray film cassette frame with said link, and means for securing said projection, said first, second, third and fourth arm, and said link in preselected positions to thereby dispose said film cassette frame in any desired position along a 360° arc of said first path and along a 360° arc of said second path.

2. Apparatus as set forth in claim 1 wherein said suspension arms are arranged for cooperative articulation to move said cassette frame longitudinally toward and away from said clamping member.

3. Apparatus as set forth in claim 1 wherein said clamping means includes a pair of clamping jaws, and means for operating said jaws to move said jaws between clamping positions and non-clamping positions.

4. Apparatus as set forth in claim 1 including means for adjusting said cassette frame to receive and retain differing film cassettes.

5. Apparatus as set forth in claim 4 wherein said adjusting means includes a pair of frame members, means mounting each of said frame members for slidable movement relative to each other, and binding means for securing each said frame member in a preselected position.

6. Apparatus as set forth in claim 1 wherein securing means includes a plurality of independently operable clamp screws.

* * * * *